United States Patent
Takahashi et al.

(10) Patent No.: US 6,840,236 B2
(45) Date of Patent: Jan. 11, 2005

(54) ENGINE CONTROL DEVICE

(75) Inventors: Michiyasu Takahashi, Shizuoka (JP); Hitoshi Hasegawa, Shizuoka (JP); Yuichiro Sawada, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 10/493,259

(22) PCT Filed: Oct. 22, 2002

(86) PCT No.: PCT/JP02/10947

§ 371 (c)(1), (2), (4) Date: Apr. 21, 2004

(87) PCT Pub. No.: WO03/036068

PCT Pub. Date: May 1, 2003

(65) Prior Publication Data

US 2004/0254714 A1 Dec. 16, 2004

(30) Foreign Application Priority Data

Oct. 23, 2001 (JP) ..................... 2001-325512

(51) Int. Cl.$^7$ ................................. F02P 9/00
(52) U.S. Cl. .................. 123/612; 123/616; 123/617
(58) Field of Search ................ 123/319, 612, 123/616, 617, 618; 377/17; 324/160

(56) References Cited

U.S. PATENT DOCUMENTS 4,787,354 A * 11/1988 Wilens et al. .......... 123/406.19
5,469,823 A    11/1995 Ott et al.
6,034,525 A     3/2000 Koerner et al.
6,119,666 A     9/2000 Fischer et al.

FOREIGN PATENT DOCUMENTS

| JP | 60-162959 | 8/1985 |
| JP | 60-190866 | 9/1985 |
| JP | 10-227252 | 8/1998 |

* cited by examiner

Primary Examiner—Bibhu Mohanty
(74) Attorney, Agent, or Firm—Hogan & Hartson, LLP

(57) ABSTRACT

To accurately detect occurrence of erroneous detection of a crank pulse associated with dropout of a crank pulse or occurrence of noise.

A cogless section is provided in cogs provided on an outer periphery of a crankshaft for transmitting a crank pulse. Occurrence of erroneous detection of a crank pulse is detected through use of an instantaneous rotational speed of the crankshaft computed from a crank pulse assigned to the cogless section and crank pulses assigned to cogs before and after the cogless section. When too few crank pulses are detected, a rapid increases arises in the instantaneous rotational speed of the crankshaft computed from the crank pulses after occurrence of a rapid decrease. The number of detected cramp pulses—which are fewer than the original crank pulses—is detected from the number of crank pulses existing between occurrence of a rapid decrease and occurrence of a rapid increase. When a too many crank pulses are detected, a rapid decrease arises in the instantaneous rotational speed of the crankshaft after occurrence of a rapid increase. The number of detected crank pulses—which are greater in number than the original crank pulses—is detected from the number of crank pulses existing between occurrence of a rapid increase and occurrence of a rapid decrease.

3 Claims, 12 Drawing Sheets

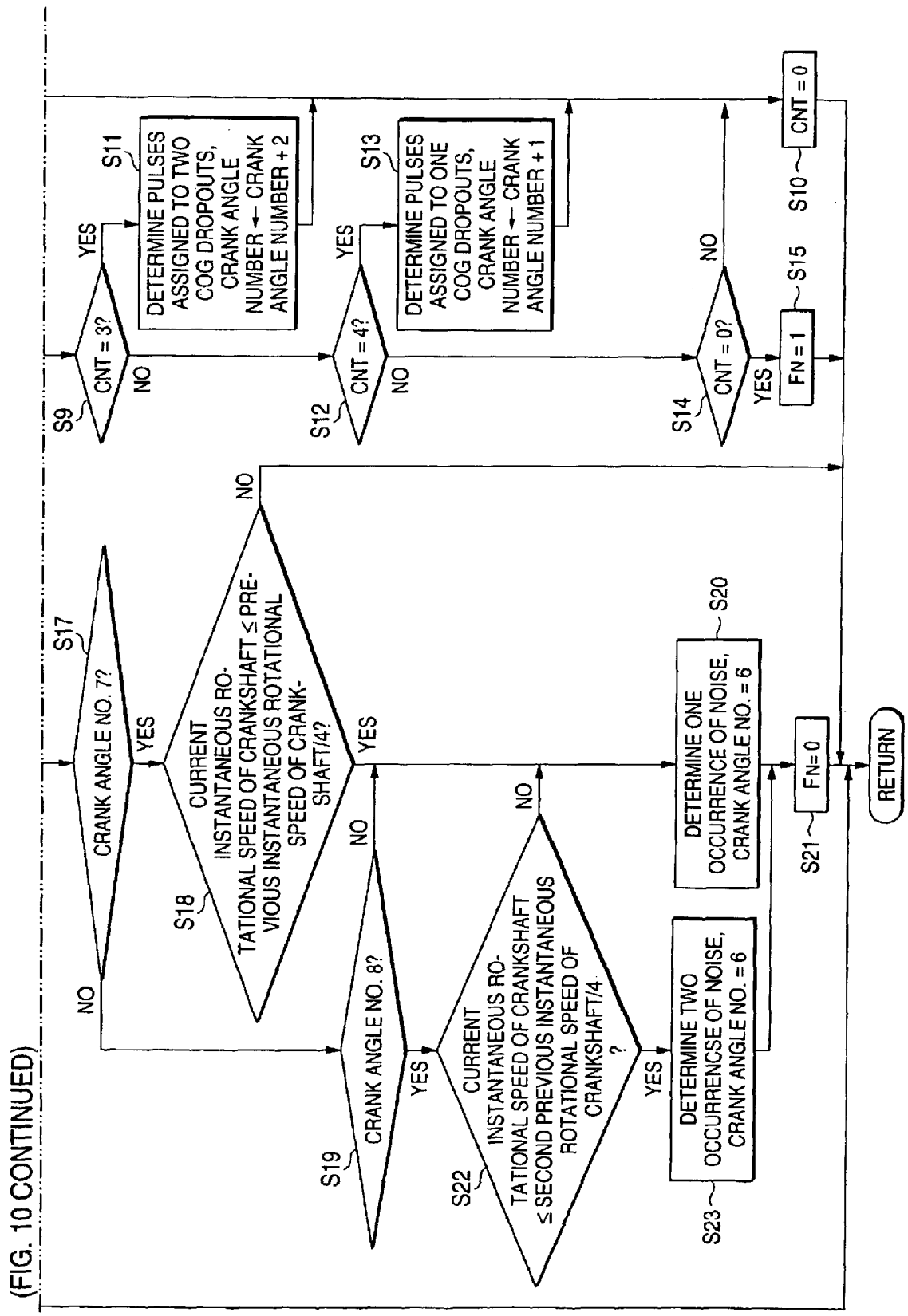

ENGINE CONTROL DEVICE

TECHNICAL FIELD

The present invention relates to an engine controller for controlling an engine, and more particularly, to an engine controller suitable for use in controlling an engine equipped with a fuel injector which injects fuel.

BACKGROUND ART

As a fuel injection device called an injector has recently become pervasive, control of a fuel injection timing and control of quantity of fuel to be injected; that is, control of an air—fuel ratio, has become easy. As a result, fostering an increase in power, a reduction in fuel consumption, and cleansing of exhaust gases has become possible. In relation particularly to a timing at which fuel is to be injected from among the foregoing elements, strictly speaking, the state of an intake valve; that is, the phase state of a cam shaft, is detected, and fuel is usually injected in accordance with the thus-detected phase state. However, a so-called cam sensor to be used for detecting the phase state of the cam shaft is expensive. The cam sensor presents a problem of an increase in the size of a cylinder head of, particularly, a two-wheeled vehicle, and hence in many cases cannot be adopted. For this reason, an engine controller is proposed in, e.g., JP-A-10-227252, wherein the phase state of a crankshaft and an air intake pressure are detected, and the stroke state of a cylinder is then detected on the basis of these detection results. Use of this related-art technique enables detection of a stroke state without detecting the phase of a cam shaft. Hence, the fuel injection timing or the like can be controlled in accordance with the stroke state.

Detection of the phase state of the crankshaft requires formation of cogs in the crankshaft or an outer periphery of a member which rotates in synchronism with the crankshaft, detection of an approach to the cogs through use of a magnetic sensor or the like, transmission of a pulse signal, and detection of the pulse signal as a crank pulse. The phase state of the crankshaft is detected by numbering the thus-detected crank pulse. In order to effect numbering or the like, the cogs are often provided at uneven intervals. Specifically, the thus-detected crank pulse is characterized by a mark. Fuel injection timing and ignition timing are controlled in accordance with the thus-characterized crank pulse.

However, particularly in the case of an engine for a two-wheeled vehicle having a small displacement and a single cylinder, an engine speed greatly decreases when, e.g., a throttle is opened rapidly, detection of a crank pulse at that moment sometimes fails. Alternatively, electrical noise associated with firing may sometimes be detected erroneously as a crank pulse. If too many or too few crank pulses are detected; i.e., if crank pulse detection is erroneous, there will arise a problem of actual injection timing or ignition timing differing from controlled injection timing or controlled ignition timing. A specific technique for detecting occurrence of erroneous detection of such a crank pulse is never available.

The present invention is developed to solve the problem and aims at providing an engine controller capable of accurately detecting occurrence of erroneous detection of a crank pulse.

DISCLOSURE OF INVENTION

To solve the problem, an engine controller according to claim 1 of the invention comprises: cogs provided at non-uniform intervals on an outer periphery of a crankshaft or a member which rotates in synchronism with the crankshaft; crank pulse generation means which transmits a pulse signal in association with an approach to the cogs; crankshaft phase detection means for detecting the phase of a crankshaft from the crank pulse; engine control means for controlling the operating state of an engine on the basis of the phase of the crankshaft detected by the crankshaft phase detection means; and erroneous-detection-of-crank-pulse detection means which detects occurrence of erroneous detection of the crank pulse by means of comparing the rotational speed of the crankshaft determined from crank pulses assigned to specific cogs from among the cogs provided at non-uniform intervals with the rotational speed of the crankshaft determined from crank pulses assigned to cogs located in the vicinity of the specific cogs.

In order to compute a rotational speed of the crankshaft from crank pulses assigned to cogs provided on an outer periphery of a crankshaft or a member which rotates in synchronism with the crankshaft, actual phases of the two cogs are divided by a time required to detect crank pulses assigned to a current cog and a previous cog, thereby determining a rotational speed of the crankshaft per unit time.

An engine controller according to claim 2 of the invention is characterized by the engine controller according to claim 1 in that, on the assumption that a pitch between the specific cogs among the cogs provided at non-uniform intervals is $\alpha$ times a pitch between the other cogs, when the instantaneous rotational speed of the crankshaft obtained from a crank pulse assigned to a cog before then specific cog is one-$\alpha^{th}$ or less a predicated rotational speed of the crankshaft obtained from a crank pulse assigned to the previous cog and when the instantaneous rotational speed of the crankshaft obtained from the crank pulse assigned to the specific cog is $\alpha$ times or more the average value of rotational speed of the crankshaft, a determination is made that crank pulse detection is erroneous, in that too few crank pulses are detected.

Specifically, the instantaneous rotational speed of the crankshaft indicates a rotational speed of the crankshaft computed from a crank pulse assigned to a certain cog and another crank pulse assigned to a previous cog. The average value of rotational speed of the crankshaft indicates a moving average value of rotational speed of the crankshaft and the like.

An engine controller according to claim 3 of the invention is characterized by the engine controller according to claim 1 or 2 in that, on the assumption that a pitch between the specific cogs from among the cogs provided at non-uniform intervals is $\alpha$ times a pitch between the other cogs, when the instantaneous rotational speed of the crankshaft determined from the crank pulse assigned to the specific cogs is $\alpha$ times an average value of rotational speed of the crankshaft and when the instantaneous rotational speed of the crankshaft determined from crank pulses assigned to a cog next to the specific cog and those assigned to subsequent cogs is one-2$\alpha$th or less the instantaneous rotational speed of the crankshaft obtained previously, a determination is made that detection is erroneous, in that too many crank pulses are detected.

BEST MODE FOR CARRYING OUT THE INVENTION

An embodiment of the invention will be described hereinbelow.

Figure 1:
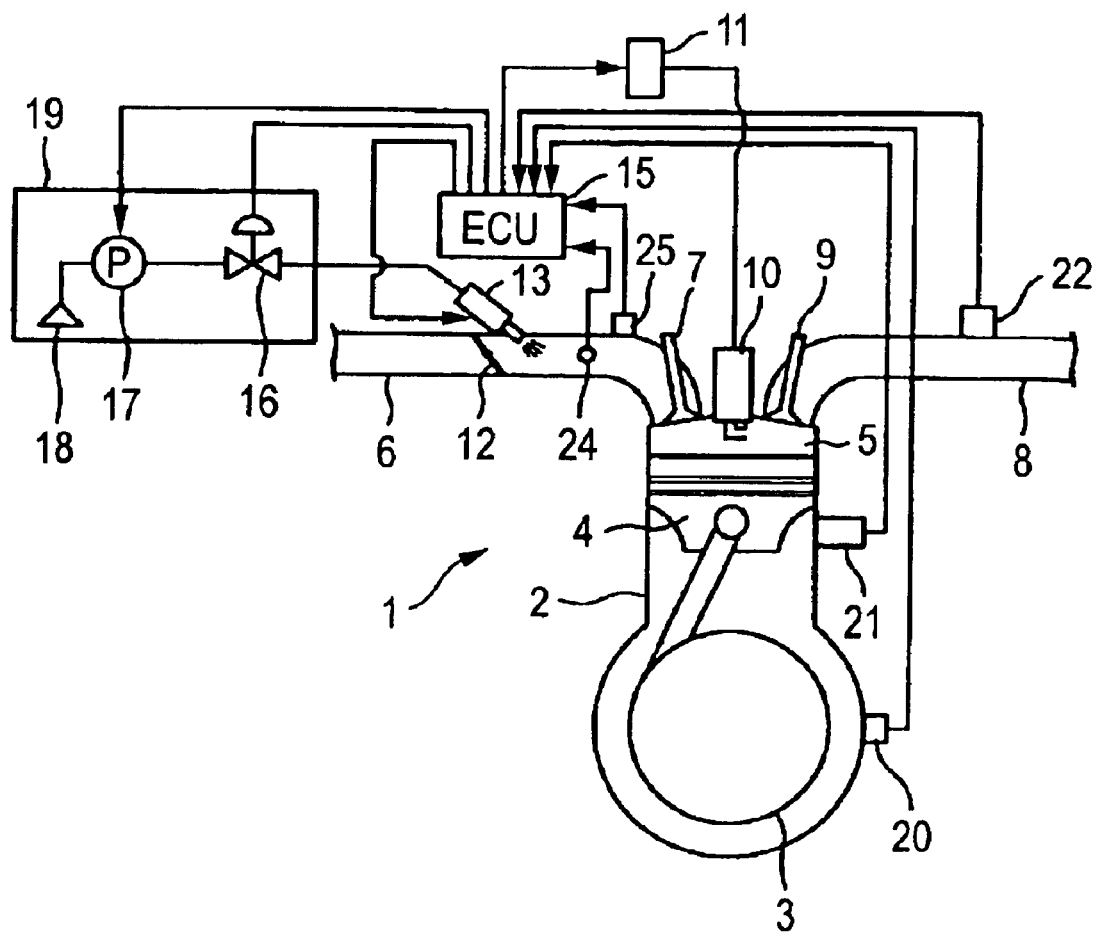
FIG. 1 is a schematic block diagram of a motorcycle engine and a controller thereof.

FIG. 1 is a schematic block diagram showing, e.g., an example motorcycle engine and an example controller thereof. An engine 1 is a single-cylinder four-cycle engine having a comparatively small displacement and has a cylinder body 2, a crankshaft 3, a piston 4, a combustion chamber 5, an intake pipe 6, an intake valve 7, an exhaust pipe 8, an exhaust valve 9, a spark plug 10, and an ignition coil 11. A throttle valve 12 to be opened and closed in accordance with an accelerator position is provided in the intake pipe 6. An injector 13 serving as a fuel injector is provided in the intake pipe 6 downstream from the throttle valve 12. The injector 13 is connected to a filter 18 provided in a fuel tank 19, a fuel pump 17, and a pressure control valve 16.

The operating state of the engine 1 is controlled by an engine control unit 15. Provided as means for detecting control inputs to the engine control unit 15; that is, the operating state of the engine 1, are a crank angle sensor 20 for detecting the rotation angle of the crankshaft 3 or the phase of the same; a cooling water temperature sensor 21 for detecting the temperature of the cylinder body 2 or the temperature of cooling water; i.e., the temperature of an engine main body; an exhaust air-fuel ratio sensor 22 for detecting an air-fuel ratio in the exhaust pipe 8; an intake pressure sensor 24 for detecting the pressure of intake air within the intake pipe 6; and an intake air temperature sensor 25 for detecting the inside temperature of the intake pipe 6; i.e., an intake air temperature. The engine control unit 15 receives detection signals output from the sensors and outputs control signals to the fuel pump 17, the pressure control valve 16, the injector 13, and the ignition coil 11.

Figure 2A:
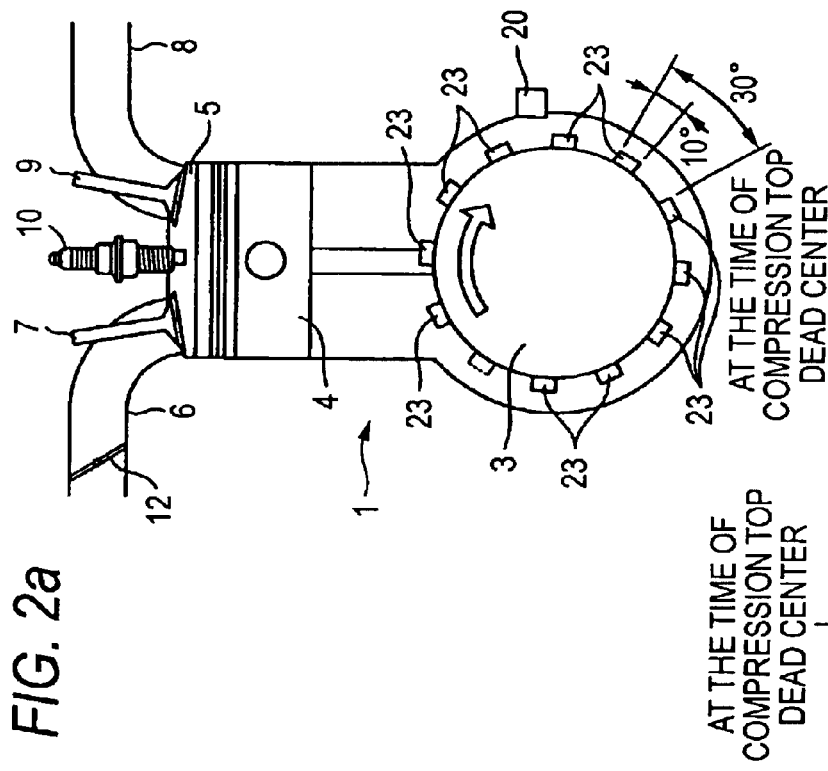
FIG. 2 is a descriptive view pertaining to the principle by which the engine shown in FIG. 1 transmits a crank pulse.

Here, the principle of a crank angle signal output from the crank angle sensor 20 will be described. In the embodiment, as shown in FIG. 2a, a plurality of cogs 23 are projectingly provided on an outer periphery of the crankshaft 3 at substantially uniform intervals, and an approach of the cog is detected by means of the crank angle sensor 20, such as a magnetic sensor or the like. A detection result is subjected to electric processing, as required, and a pulse signal is transmitted. A circumferential pitch between the cogs 23 is 30° in terms of a phase (rotational angle) of the crankshaft 3. The circumferential width of each cog 23 is set to 10° in terms of the phase (rotational angle) of the crankshaft 3. Only one pitch between cogs 23 does not comply with the specified pitch, and is double that between the other cogs 23. As indicated by a two-dot chain line in FIG. 2a, the reason for this is a special setting, wherein no cog is provided in a place where a cog would be disposed if all the pitches are identical. This place corresponds to an on-uniform interval. Hereinafter, this place will also be called a cogless section.

Figure 2B:
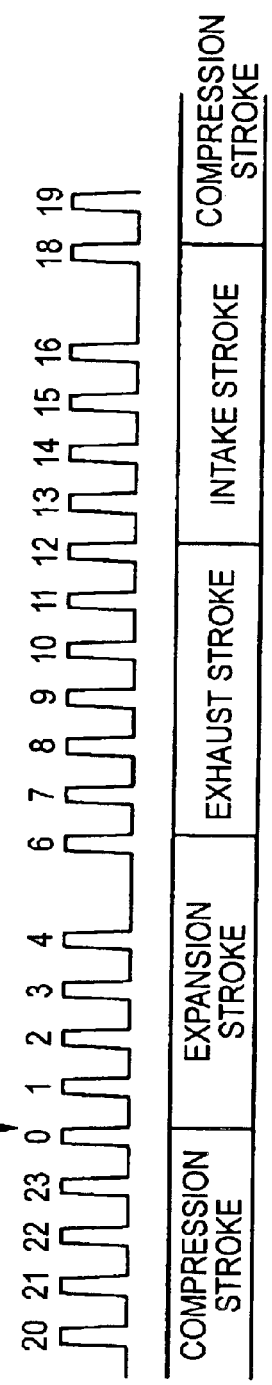

A pulse signal train produced by the respective cogs 23 when the crankshaft 3 is rotating at constant velocity appears as shown in FIG. 2b. FIG. 2a shows the state of the crankshaft achieved at a compression top dead center (which is also identical in shape with the state of the crankshaft achieved at an exhaust top dead center). A pulse signal immediately preceding the time when the compression top dead center is achieved is numbered (assigned a number) "0" in the drawing; the next pulse signal is numbered "1" in the drawing; the next pulse signal is numbered "2" in the drawing; and subsequent pulse signals are numbered up to "4" in the drawing. The cog 23 corresponding to the pulse signal "4" in the drawing is followed by the cogless section. However, the cogless section is counted as an extra cog as if a cog are present. Then, a pulse signal assigned to the next cog 23 is numbered "6" in the drawing. Numbering of the cogs is continued, whereupon a pulse signal "16" in the drawing is followed and approached by the cogless section. Hence, the cogless section is counted as an extra cog in the same manner as mentioned previously. A pulse signal assigned to the next cog 23 is numbered "18" in the drawing. When the crankshaft 3 has made two rotations, a complete cycle consisting of four strokes is completed. Hence, when pulse signals are numbered up to "23" in the drawing, a pulse signal assigned to the next cog 23 is again numbered "0" in the drawing. In principle, the pulse signal corresponding to the cog 23 numbered 0 should be immediately followed by the compression top dead center. As mentioned above, the detected pulse signal train or single pulse signals thereof are defined as crank pulses. When stroke detection is performed on the basis of the crank pulses in a manner which will be described later, a crank timing can be detected. The same is also achieved even when the cogs 23 are provided on an outer periphery of a member which rotates in synchronism with the crankshaft 3.

Figure 3:
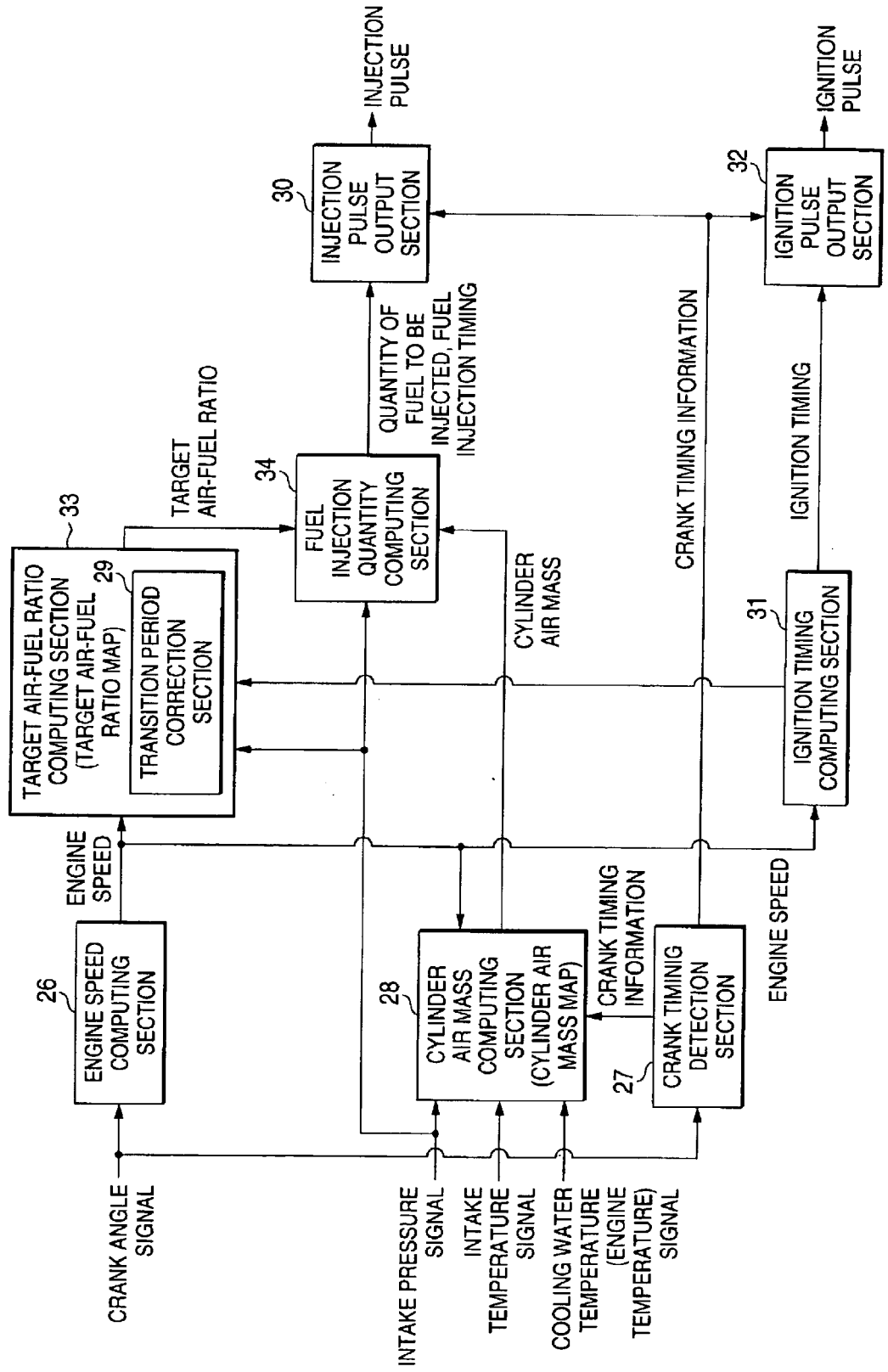
FIG. 3 is a block diagram showing an embodiment of the engine controller of the invention.

The engine control unit 15 is constituted of an unillustrated microcomputer or the like. FIG. 3 is a block diagram showing an embodiment of engine control processing to be performed by the microcomputer provided in the engine control unit 15. The computation processing is performed by an engine speed computing section 26 for computing an engine speed from the crank angle signal; a crank timing detection section 27 which detects crank timing information; i.e., a stroke state, from the crank angle signal and the intake pressure signal; a cylinder air mass computing section (intake air quantity computing means) 28 which loads the crank timing information detected by the crank timing detection section 27 and computes a cylinder air mass (the quantity of intake air) from the air intake temperature signal, the cooling water temperature (engine temperature) signal, the intake pipe pressure signal, and the engine speed computed by the engine speed computing section 26; a target air-fuel ratio computing section 33 which computes a target air-fuel ratio from the engine speed computed by the engine speed computing section 26 and the intake pressure signal; a fuel injection quantity computing section 34 which computes the quantity of fuel to be injected and a fuel injection timing from the target air-fuel ratio computed by the target air-fuel ratio computing section 33, the intake pressure signal and the cylinder air mass computed by the cylinder air mass computing section 28; an injection pulse output section 30 which loads the crank timing information detected by the crank timing detection section 27 and outputs, to the injector 13, an injection pulse corresponding to the fuel injection quantity computed by the fuel injection quantity computing section 34 and to the fuel injection timing; an ignition timing computing section 31 which computes an ignition timing from the engine speed computed by the engine speed computing section 26 and the target air-fuel ratio set by the target air-fuel ratio computing section 33; and an ignition pulse output section 32 which loads the crank timing information detected by the crank timing detection section 27 and outputs, to the ignition coil 11, an ignition pulse corresponding to the ignition timing set by the ignition timing computing section 31.

The engine speed computing section 26 computes, as an engine speed, the rotational speed of the crankshaft—which is an output shaft of the engine—from the time-varying rate of the crank angle signal.

Figure 4:
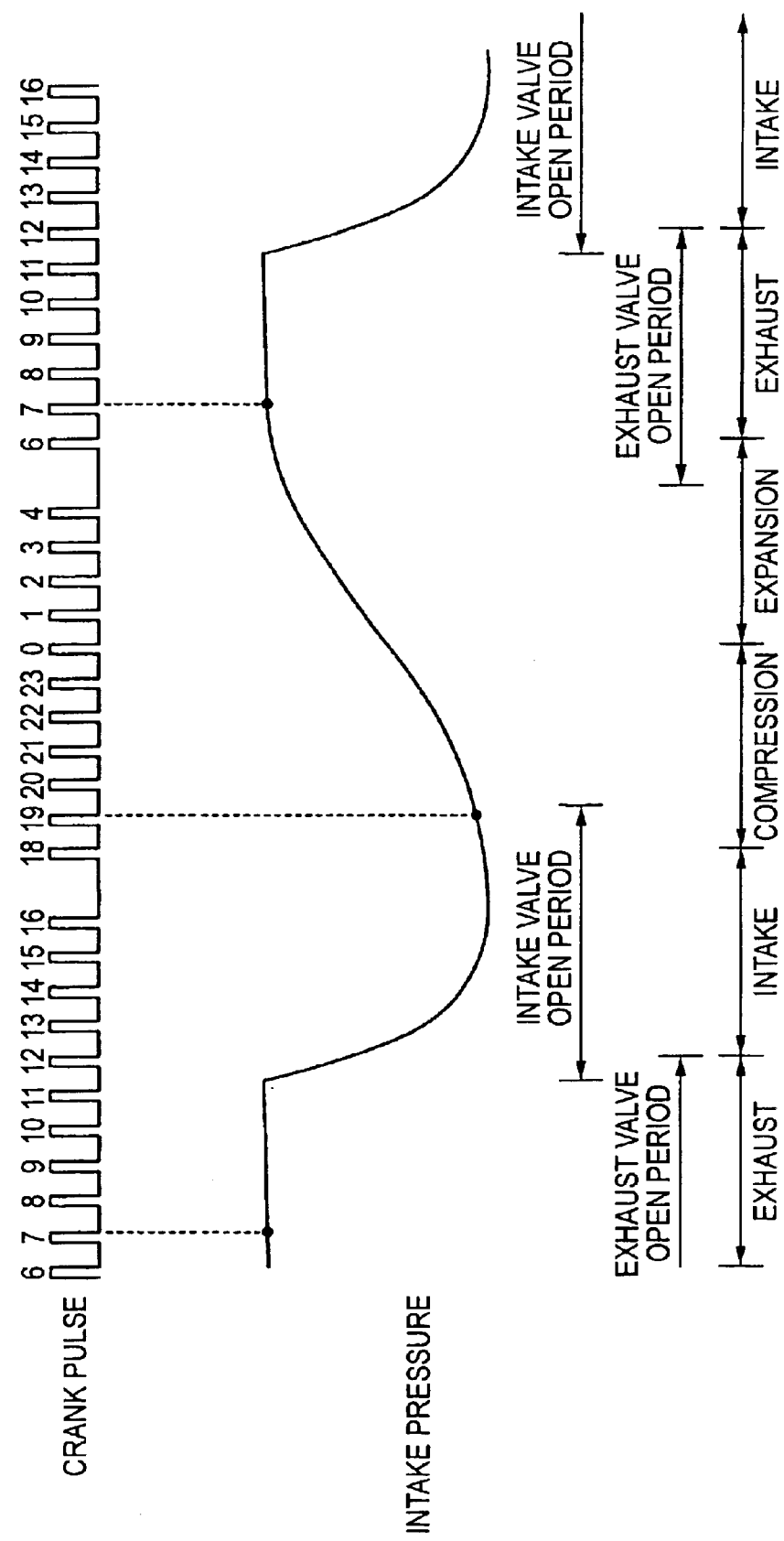
FIG. 4 is a descriptive view for detecting the state of a stroke on the basis of the phase of a crankshaft and an intake pressure.

The crank timing detection section 27 has a configuration analogous to that of a stroke determination device described in previously-mentioned JP-A-10-227252. By means of the crank timing detection section, the stroke state of each cylinder is detected as shown in, e.g., FIG. 4, and the thus-detected state is output as crank timing information. Specifically, in a four-cycle engine the crankshaft and a cam shaft rotate continuously with a predetermined phase difference remaining therebetween. For instance, when the crank pulse is loaded in the manner as shown in FIG. 4, the crank pulse numbered "9" or "21" in the drawing, which corresponds to the fourth cog from the cogless section, represents either an exhaust stroke or a compression stroke. As is well known, the exhaust valve is closed during the exhaust stroke, and the intake value remains closed. Therefore, the intake pressure is high. In an initial stage of the compression stroke, the intake valve remains open, and hence the intake pressure is low. Alternatively, even when the intake value remains closed, the intake pressure is already made low during the preceding intake stroke. Accordingly, the crank pulse "21" in the drawing achieved at the low intake pressure shows that the engine is in the compression stroke. The compression top dead center is achieved immediately after the crank pulse numbered 0 in the drawing is achieved. In this way, when any of the stroke states is detected, the current stroke state can be detected in more detail, so long as intervals between the strokes are interpolated with the rotational speed of the crankshaft.

Figure 5:
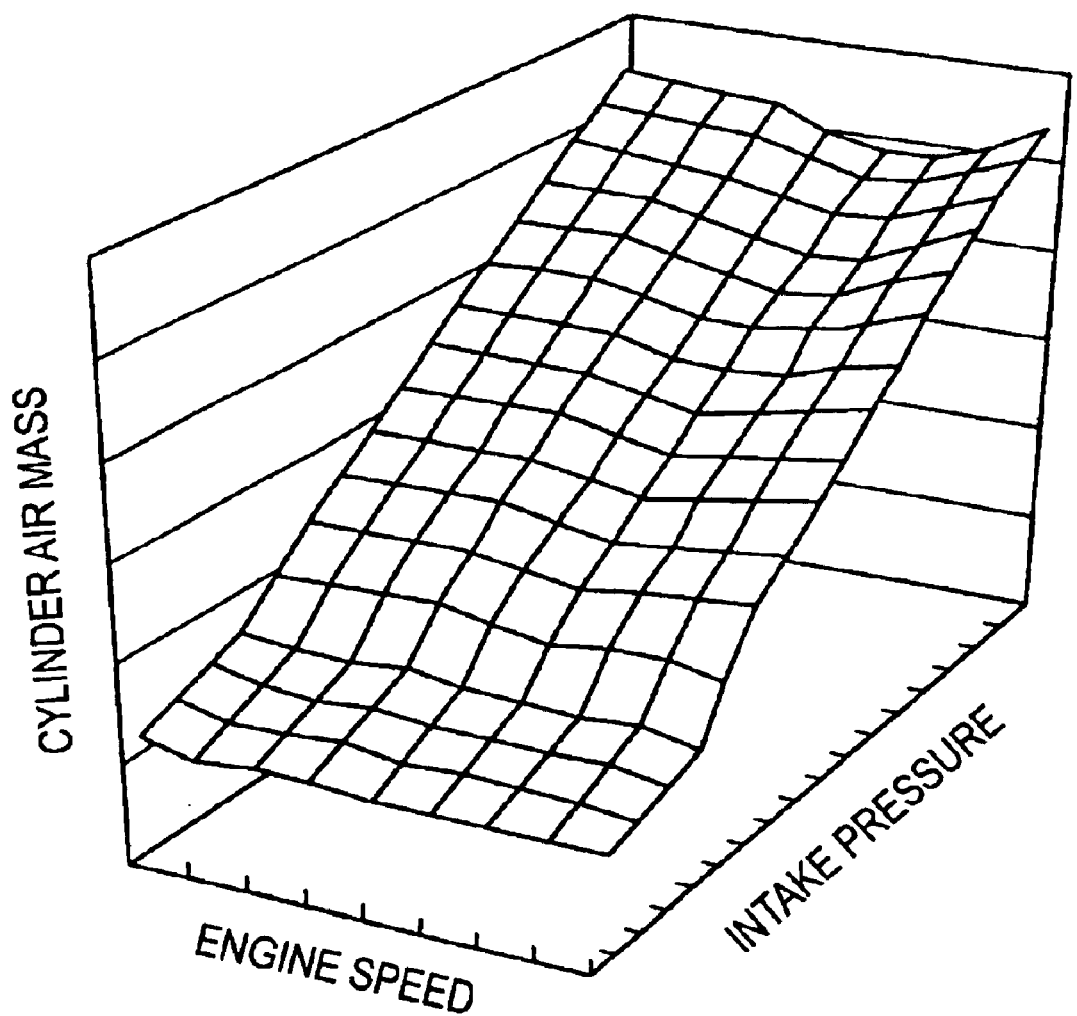
FIG. 5 is a map to be used for computing the mass of air stored in a cylinder, the mass being stored in a cylinder air mass computing section.

As shown in FIG. 5, the cylinder air mass computing section 28 has a three-dimensional map to be used for computing the mass of air in the cylinder from the intake pressure signal and the engine speed computed by the engine speed computing section 26. The three-dimensional map pertaining to the cylinder air mass can be measured through a comparatively simple test; that is, by means of measuring the mass of air in the cylinder achieved when the intake pressure is changed while the engine is actually rotating at a predetermined speed. Hence, preparation of the map is easy. Further, if sophisticated engine simulation is available, the map can also be prepared through use of the simulation. Here, the mass of air in the cylinder changes depending on the temperature of the engine. Therefore, the cylinder air mass may be corrected through use of the cooling water temperature (engine temperature) signal.

Figure 6:
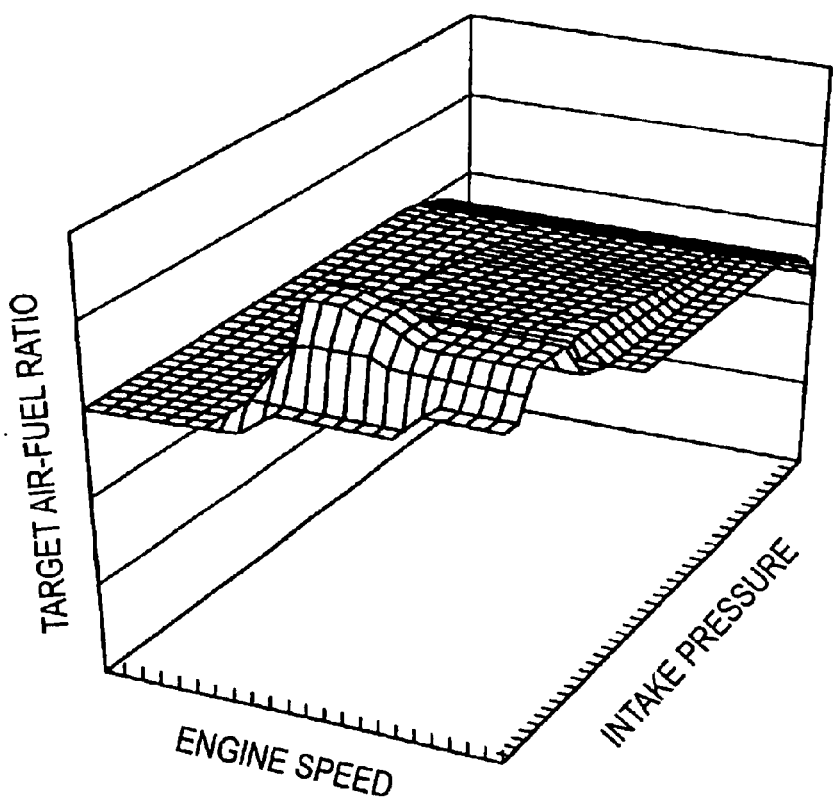
FIG. 6 is a map to be used for computing a target air-fuel ratio stored in a target air-fuel ratio computing section.

As shown in FIG. 6, the target air-fuel ratio computing section 33 is equipped with a three-dimensional map to be used for computing a target air-fuel ratio from the intake pressure signal and the engine speed computed by the engine speed computing section 26. To a certain extent, this three-dimensional map can also be set up theoretically. The air-fuel ratio is usually in correlation with torque. When an air-fuel ratio is low; that is, when fuel content is high and air content is low, torque is increased whereas efficiency decreases. Conversely, when the air-fuel ratio is high; that is, when fuel content is low and air content is high, torque decreases whereas efficiency improves. A state in which the air-fuel ratio is low is called a rich state, whilst a state in which the air-fuel ratio is high is called a lean state. The leanest state is a so-called ideal air-fuel ratio and is called a stoichiometric state corresponding to a air-fuel ratio at which gasoline burns completely; that is, 14.7. The engine speed means the operating state of the engine. In general, when the engine is in a high-revolution range, the air-fuel ratio is increased; and, when the engine is in a low-revolution range, the air-fuel ratio is decreased. The reason for this is that torque response is increased at the low-revolution range and that the responsiveness of the rotating speed is increased in the high-revolution range. Here, the intake pressure means the loaded condition of the engine, such as throttle opening. Generally, when the loaded condition of the engine is heavy; that is, when throttle opening is wide, and the intake pressure is high, the air-fuel ratio is decreased. When the loaded condition of the engine is light; that is, when the throttle opening is narrow, and the intake pressure is low, the air-fuel ratio is increased. The reason for this is that emphasis is placed on torque when the loaded condition of the engine is heavy and that emphasis is placed on efficiency when the loaded condition of the engine is light.

As mentioned above, the target air-fuel ratio is a numeral whose physical meaning is easy to ascertain. Accordingly, the target air-fuel ratio can be set to a certain extent in accordance with a required output characteristic of the engine. As a matter of course, it goes without saying that tuning may be performed in accordance with the output characteristic of the engine of an actual vehicle.

Figure 7:
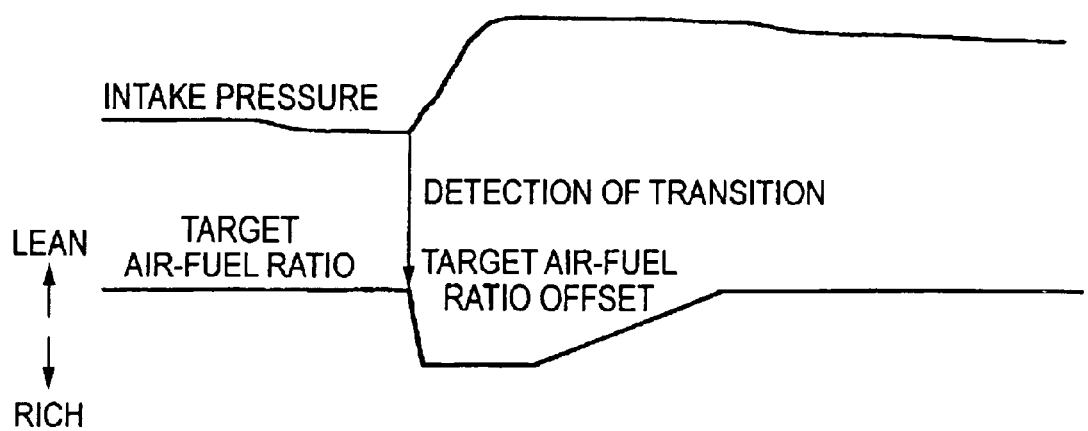
FIG. 7 is a descriptive view for describing the operation of a transition period correction section.

The target air-fuel ratio computing section 33 has a transition period correction section 29 which detects the transient period of operating state of the engine from the intake pressure signal; specifically, the accelerating and decelerating states of the engine, and corrects the air-fuel ratio in accordance with the thus-detected states. As shown in, e.g., FIG. 7, the intake pressure also stems from throttle operation. Hence, when the intake pressure increases, the engine is considered to be in an accelerating state in which demand exists for opening of the throttle to achieve acceleration. If such an accelerating state is detected, the target air-fuel ratio is temporarily set to the rich side in accordance with the detected accelerating state. Subsequently, the air-fuel ratio is reset to the original target air-fuel ratio. An existing method can be utilized as a way to reset the air-fuel ratio to the original air-fuel ratio, wherein, for example, a gradual change is made in a weighting coefficient to be used for determining a weighted average value between the air-fuel ratio set to the rich side during a transition period and the original target air-fuel ratio. Conversely, if the decelerating state is detected, the air-fuel ratio may be set to a position closer to the lean side with reference to the original target air-fuel ratio, thereby placing emphasis on efficiency.

The fuel injection quantity computing section 34 can determine the mass of fuel required in the cylinder by dividing cylinder air mass computed by the cylinder air mass computing section 28 by the target air-fuel ratio computed by the target air-fuel computing section 33. A fuel injection time can be determined by multiplying the thus-computed mass of fuel by, e.g., the flow-rate characteristic of the injector 13. The quantity of fuel to be injected and the fuel injection timing can be computed from the fuel injection time.

As mentioned above, in the embodiment, the mass of air in the cylinder is computed from the intake pressure and the operating state of the engine in accordance with the previously-stored cylinder air mass three-dimensional map. In accordance with the previously-stored target air-fuel ratio map, the target air-fuel ratio is computed from the intake pressure and the operating state of the engine. The cylinder air mass is divided by the target fuel-air ratio, thereby computing the quantity of fuel to be injected. Hence, control is facilitated and rendered accurate. The cylinder air mass map is easy to measure, and the target air-fuel ratio map is easy to set. Hence, mapping operation becomes easy. Further, the necessity for using a throttle sensor for detecting engine load, such as a throttle opening sensor or a throttle position sensor, is obviated.

Moreover, from the intake pressure the engine is detected as being in a transition phase, such as an accelerating state or a decelerating state, thereby correcting the target air-fuel ratio. An output characteristic of the engine to be achieved at the time of acceleration or deceleration is set merely in accordance with the target air-fuel ratio. Hence, the output characteristic can be changed to satisfy the driver's requirement or so as to be close to the driver's perception.

The engine speed can also be detected readily by means of detecting the engine speed from the phase of the crankshaft. For instance, if the stroke status is detected from the phase of the crankshaft in lieu of a cam sensor, an expensive, large-scale cam sensor can be obviated.

Figure 8A:
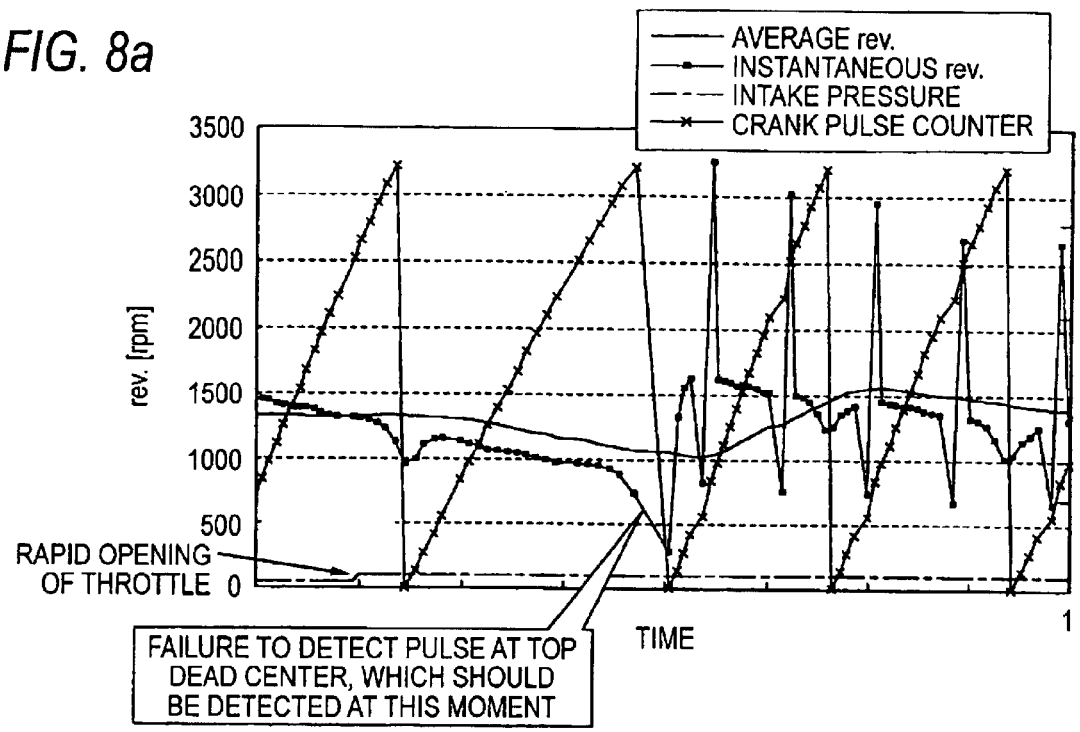
FIG. 8 is a descriptive view showing erroneous detection of a crank pulse.

As mentioned above, according to the embodiment which does not employ any cam sensor, the phase of the crankshaft is important. For this reason, the crank pulse must be detected accurately. However, in reality, a failure to detect a crank pulse and erroneous detection of noise as a crank pulse can feasibly occur. For instance, FIG. 8a shows an instantaneous rotational speed of the crankshaft achieved when the throttle valve is opened rapidly (i.e., an "instantaneous rev" in the drawings), an average value of rotational speed of the crankshaft ("average rev" in the drawing), an intake pressure, and numbered crank pulses (a "crank pulse counter" in the drawing). As mentioned above, the instantaneous rotational speed of the crankshaft is a value determined by the phase of the cog (i.e., the rotational speed) corresponding to the crank pulse divided by the time required when the crank pulse is detected until the next crank pulse is detected. The average value of rotational speed of the crankshaft is an instantaneous moving average value of rotational speed of the crankshaft.

Figure 8B:
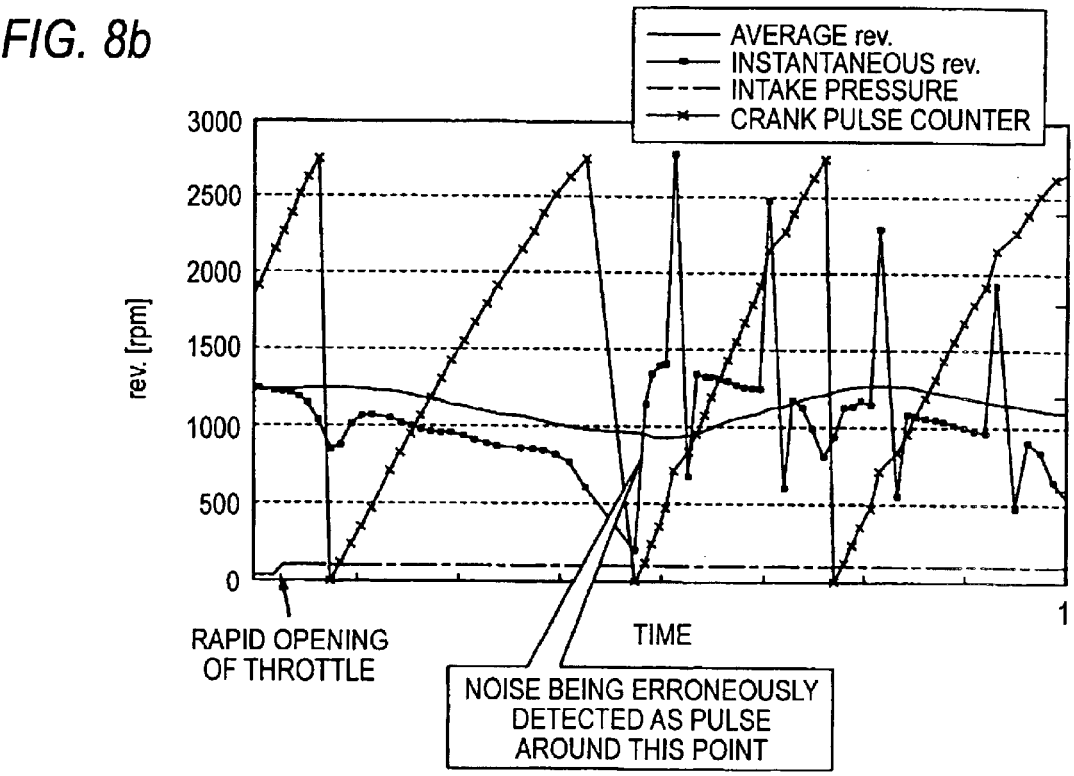

In the single-cylinder engine having a small displacement such as that shown in the embodiment, the engine speed is greatly decreased in association with rapid opening of the throttle valve. There is a chance of failure to detect a crank pulse at that moment. Even in FIG. 8a, when the engine speed has dropped after rapid opening of the throttle valve, the crank pulse at the top dead center that should originally be detected cannot be detected. For this reason, an increase in the count value of the crank pulse counter does not become linear. Further, the phase (rotational angle) of the crankshaft achieved in the vicinity of the cogless section is recognized erroneously. Hence, the instantaneous rotational speed of the crankshaft becomes greatly distorted. Similarly, FIG. 8b shows an example in which noise derived from firing effected in the vicinity of the compression top dead center after rapid opening of the throttle valve is erroneously detected as a crank pulse. As a result, the count value of the crank pulse counter does not become linear, and the instantaneous rotational speed of the crankshaft obtained in the vicinity of the cogless section becomes greatly distorted.

Figure 9:
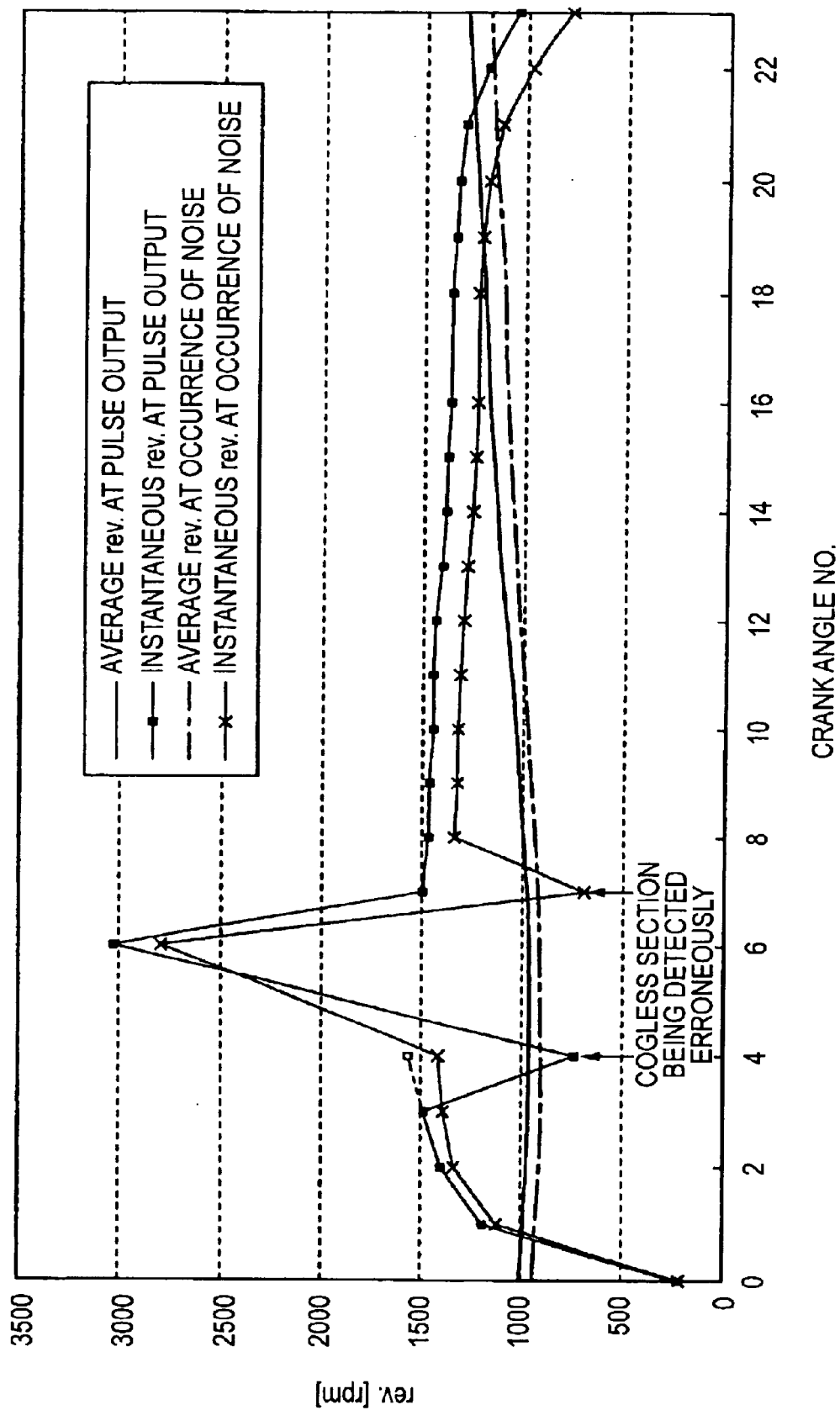
FIG. 9 is a descriptive view for describing a difference between the rotational speed of a crankshaft achieved with a dropout of a crank pulse and that achieved when noise arises.

When focus is placed on the time at which detection of the crank pulse has come to end in a failure, i.e., the time at which the crank pulse has dropped out, and the time at which noise is detected erroneously as a crank pulse, i.e., an instantaneous rotational speed of the crankshaft achieved at the time of occurrence of noise, characteristics have come to be observed in the cogless section and the neighborhood thereof. FIG. 9 shows that an average value of rotational speed of the crankshaft achieved at the time of dropout of the crank pulse (i.e., a "average rev. pule dropout" in the drawing), an instantaneous rotational speed of the crankshaft at the time of dropout of the crank pulse (i.e., an "instantaneous rev at pulse dropouts" in the drawing), an average value of rotational speed of the crankshaft achieved at the time of occurrence of noise (i.e., an "average rev at occurrence of noise" in the drawing), and an instantaneous rotational speed of the crankshaft achieved at the time of occurrence of noise (i.e., an "instantaneous rev at occurrence of noise") are plotted such that compression top dead centers are overlapped. The instantaneous rotational speed of the crankshaft rapidly increases at the same timing even when dropouts of the crank pulse and noise have occurred. In contrast, a rapid decrease arises in the instantaneous rotational speed of the crankshaft before and after that timing. Specifically, when a dropout of the crank pulse has arisen, a rapid decrease arises in the instantaneous rotational speed of the crankshaft before a rapid increase arises. Conversely, when noise arises, a rapid decrease tends to arise after a rapid increase has arisen in the instantaneous rotational speed of the crankshaft.

This is attributable to whether the crank pulse corresponding to a cog, which is to be originally detected and would be present in the cogless section, is to be detected before or after the cogless section. As mentioned above, erroneous detection of a cog which would be present in the cogless section as a normal cog is defined as erroneous detection of a cogless section. A pitch between specific cogs in the embodiment; that is, a pitch between cogs which would be in the cogless section, is double ($\alpha$ times) the pitch between other cogs (which will also be described as ordinary cogs). Hence, at the time of occurrence of dropout of a crank pulse at which a cogless section is erroneously detected at a timing at which the cogless section should originally be detected, a pitch between ordinary cogs is divided by the time required to detect a crank pulse for a cog which would be in the cogless section. Consequently, the instantaneous rotational speed of the crankshaft obtained from a crank pulse corresponding to a cog at the time of erroneous detection of the cogless section has become half (one-$\alpha^{th}$) or less a predicted rotational speed of the crankshaft obtained from the crank pulse corresponding to a preceding cog. However, as indicated by two-dot chain lines shown in FIG. 9, the predicted rotational speed of the crankshaft is obtained, by means of extending at a uniform slope the instantaneous rotational speed of the crankshaft—which is obtained when the crank pulse assigned to the cog appearing before erroneous detection of the cogless section is detected—until the cogless section is detected erroneously. After erroneous detection of the cogless section, a pitch between cogs which would be present in the cogless section is divided by the time required to detect crank pulses assigned to ordinary cogs. Consequently, the instantaneous rotational speed of the crankshaft obtained from the crank pulses assigned to ordinary cogs erroneously detected as a cogless section is twice (α times) or more the average value of rotational speed of the crankshaft.

At the time of occurrence of noise at which the cogless section is erroneously detected later than a timing at which the cogless section should originally be detected, the pitch between cogs in the cogless section is divided by the time required to detect a crank pulse assigned to ordinary cogs. Consequently, the instantaneous rotational speed of the crankshaft obtained from crank pulses assigned to ordinary cogs which are erroneously detected as those in the cogless section is double (α-times) or more the average value of rotational speed of the crankshaft. At the time of erroneous detection of a cogless section at which an actual cogless section is erroneously detected, a pitch between the ordinary cogs is divided by the time required to detect crank pulses assigned to cogs which would be present in the cogless section. Consequently, the instantaneous rotational speed of the crank shaft computed from crank pulses assigned to cogs subsequent to the cog, the cogs being erroneously detected as being present in the cogless section, have come to be one-fourth (one-$2\alpha^{th}$) or less the instantaneous rotational speed of the crankshaft obtained earlier than the instantaneous value.

Figure 10:
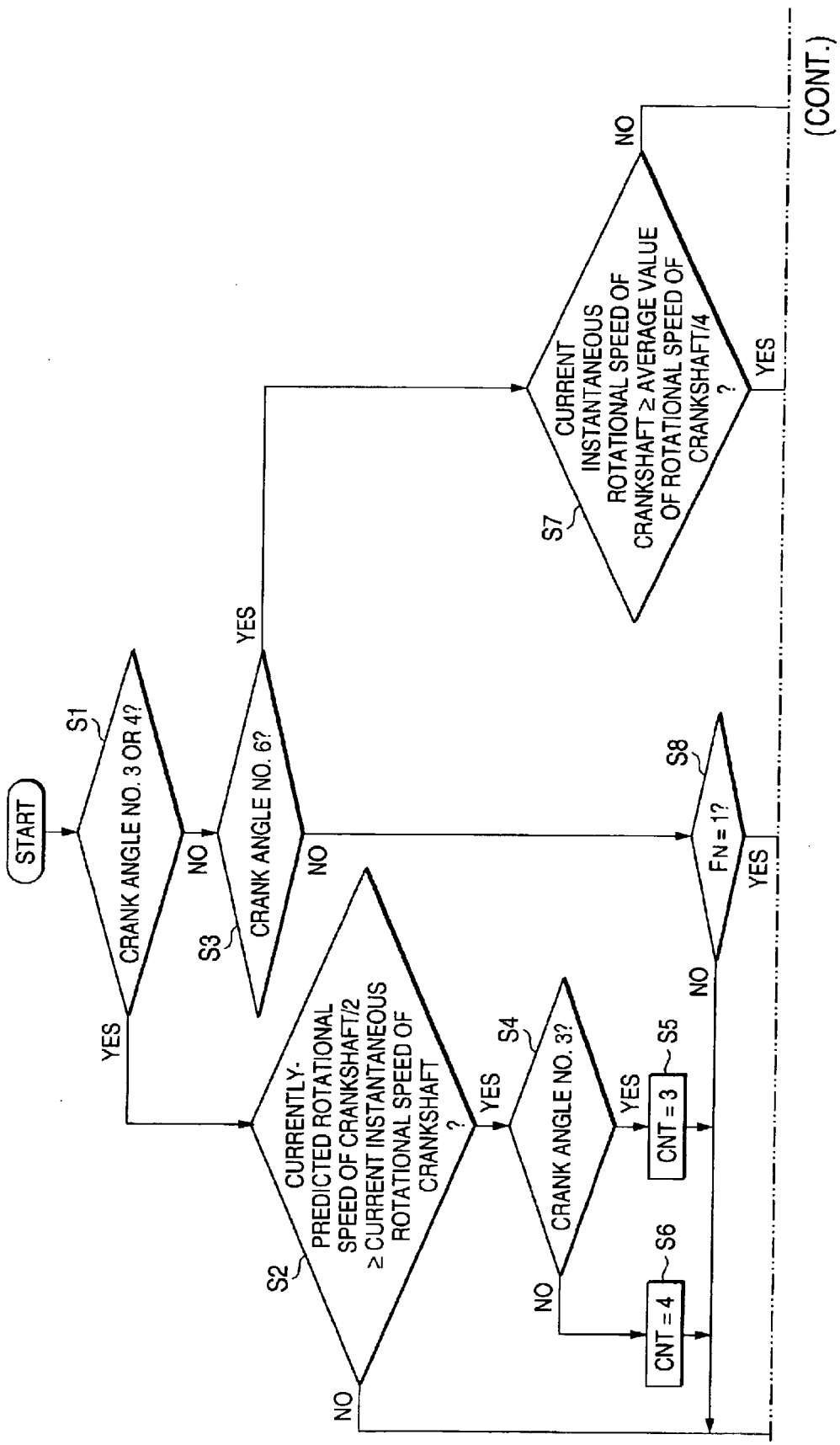
FIG. 10 is a flowchart showing computation processing for detection of erroneous-detection-of-crank-pulse and correction of a crank angle, both being performed in an engine control unit.

FIG. 10 shows computation processing to be used for detecting occurrence of erroneous-detection of a crank pulse on the basis of the rotational speed of the crankshaft obtained from such a crank pulse. The computing operation is performed by a microcomputer provided in the engine control unit 15 as interrupt processing each time a crank pulse is detected in parallel with the computing operation shown in FIG. 3, in such a way that detection of a crank pulse, e.g., is taken as a trigger. Here, the engine speed and the rotational speed of the crankshaft are substantially identical with each other, because the output shaft of the engine is a crankshaft. The flowchart is not provided with a step particularly intended for establishing communication. However, the information obtained through computing operation is updated and stored in a storage device, as required. Further, information and a program, which are required for executing the processing, are loaded from the storage device at any time.

In step S1, through computing operation, a determination is made as to whether or not the crank angle number (denoted as No. in the drawing) assigned to the crank pulse is "3" or "4." If the crank angle number is "3" or "4," processing proceeds to step S2. If not, processing proceeds to step S3.

In step S2, a determination is made as to whether or not the instantaneous value (instantaneous value in the drawing) of the rotational speed (C/S rotational speed in the drawing) of the crankshaft computed from the current crank pulse is half or less than the predicted current rotational speed of the crank shaft computed from the instantaneous rotational speed of the previous crankshaft in the manner mentioned previously. When the instantaneous rotational speed of the crankshaft is half or less than the predicted rotational speed of the crankshaft, processing proceeds to step S4. If not, processing returns to the main program.

In step S4, a determination is made as to whether or not the crank angle number is three. If the crank angle number is three, processing proceeds to step S5. If not, processing proceeds to step S6.

In step S5, a crank angle storage counter CNT is set to "3," and processing returns to the main program.

In step S6, the crank angle storage counter CNT is set to "4," and processing returns to the main program.

In step 3 a determination is made as to whether or not the crank angle number is "6." If the crank angle number is "6," processing proceeds to step S7. If not, processing proceeds to step S8.

In step S7, a determination is made as to whether or not the instantaneous rotational speed of the crankshaft computed from the current crank pulse is double or more the average value of rotational speed of the crankshaft. If the instantaneous rotational speed of the crankshaft is double or more the average value of rotational speed of the crankshaft, processing proceeds to step S9. If not, processing proceeds to step S10.

In step S9, a determination is made as to whether or not the crank angle storage counter CNT is "3." If the crank angle storage counter CNT is "3," processing proceeds to step S11. If not, processing proceeds to step S12.

In step S11, crank pulses corresponding to two cogs are determined to have dropped out. A new crank angle number calculated by addition of "two" to the original crank angle number is set, and processing proceeds to step S10.

In step S12, a determination is made as to whether or not the crank angle storage counter CNT is "4." If the crank angle storage counter CNT is "4," processing proceeds to step S13. If not, processing proceeds to step S14.

In step S13, a crank pulse corresponding to one cog is determined to have dropped out. A new crank angle number calculated by addition of "1" to the original crank angle number is set, and processing proceeds to step S10.

In step S14, a determination is made as to whether or not the crank angle storage counter CNT is "0." If the crank angle storage counter CNT is "0," processing proceeds to step S15. If not, processing proceeds to step S10.

In step S10, the crank angle storage counter CNT is set to "0," and processing returns to the main program.

In step S15, a noise flag $F_N$ is set to "1," and processing returns to the main program.

In contrast, in step S8 a determination is made as to whether or not the noise flag $F_N$ is set to 1. If the noise flag $F_N$ is set, processing proceeds to step S17. If not, processing returns to the main program.

In step S17, a determination is made as to whether or not the crank angle number is "7." If the crank angle number is "7," processing proceeds to step S18. If not, processing proceeds to step S19.

In step S18, a determination is made as to whether or not the instantaneous rotational speed of the crankshaft computed from the current crank pulse is one-fourth or less the instantaneous rotational speed of the crankshaft computed from the previous crank pulse. When the instantaneous rotational speed of the crankshaft computed from the current crank pulse is one-fourth or less the instantaneous rotational speed of the crankshaft computed from the previous crank pulse, processing proceeds to step S20. If not, processing returns to the main program.

In step S20, noise is determined have arisen once, the crank angle number is set to "6," and processing proceeds to step S21.

In step S19, a determination is made as to whether or not the crank angle number is "8." If the crank angle number is "8," processing proceeds to step S22. If not, processing proceeds to step S21.

In step S22, a determination is made as to whether or not the instantaneous rotational speed of the crankshaft computed from the current crank pulse is one-fourth or less the instantaneous rotational speed of the crankshaft computed from the second previous crank pulse. When the instantaneous rotational speed of the crankshaft computed from the current crank pulse is one-fourth or less the instantaneous rotational speed of the crankshaft computed from the second previous crank pulse, processing proceeds to step S23. If not, processing proceeds to step S21.

In step S23, noise is determined to have arisen twice. The crank angle number is set to "6," and processing proceeds to step S21.

In step S21, the noise flag $F_N$ is reset to "0," and processing returns to the main program.

In a case where a crank pulse corresponding to one cog has dropped out, a crank pulse corresponding to a cog which would be in the cogless section is detected when the crank angle number is "4" in the embodiment by means of the computing operation. Hence, when the crank angle number is "4," processing shifts from step S1 to step S2. Here, when the crank pulse corresponding to one cog has dropped out, the instantaneous rotational speed of the crankshaft computed from the current crank pulse is half or less the predicted rotational speed of the crank shaft. Accordingly, processing shifts from step S2 to step S6 by way of step S4. In step S6, the crank angle storage counter CNT is temporarily set to "4," and processing returns to the main program.

When the next crank pulse is detected, the crank angle number assigned to that crank pulse is "6." Hence, processing proceeds from step S1 to step S7 by way of step S3. When a crank pulse corresponding to one cog has dropped out, the rotational speed of the crankshaft rapidly increases after having dropped abruptly. The instantaneous rotational speed of the crankshaft computed from that crank pulse is double or more the average value of rotational speed of the crankshaft, and hence processing shifts from step S7 to step S9. Here, the crank angle storage counter CNT stored in the storage device still remains "4," and therefore processing proceeds from step S9 to step S13 by way of step S12. Here, a crank pulse corresponding to one cog is determined to have dropped out, and a value calculated by adding "1" to the original crank angle number; that is, "7," is set as a new crank angle number, i.e., a correct crank angle number, whereupon processing proceeds to step S10. The crank angle storage counter CNT is taken as "0."

When crank pulses corresponding to two cogs have dropped out, the instantaneous rotational speed of the crankshaft drops abruptly when the crank angle number is "3." Processing shifts from step S1 to step S4 by way of step S2. Here, since the crank angle number is "3," processing proceeds to step S5, where the crank angle storage counter CNT is set to "3," and processing temporarily returns to the main program. When crank pulses corresponding to two cogs have dropped out, the instantaneous rotational speed of the crankshaft abruptly drops. Then, when a second crank pulse is detected, the instantaneous rotational speed of the crankshaft increases immediately. Accordingly, when the next crank pulse for which the crank angle storage counter CNT is set to "3" is detected, the crank angle number still remains "4." Processing returns from step S1 to the main program by way of step S2.

When a crank pulse after next is detected, the crank angle number has assumed "6." Processing proceeds from step S1 to step S7 by way of step S3. At this time, the instantaneous rotational speed of the crankshaft rapidly increases and has become double or more the average value of rotational speed, and hence processing proceeds to step S9. The crank angle storage counter CNT stored in the storage device at this time still assumes "3," and hence processing proceeds to step S11, where crank pulses corresponding to two cogs are determined to have dropped out. Further, a value calculated by adding "2" to the original crank angle number; that is, "8," is set to a new crank angle number, i.e., a correct crank angle number. Processing proceeds to step S10, where the crank angle storage counter CNT is set to "0."

In contrast, when noise has arisen once, the instantaneous rotational speed of the crankshaft increases rapidly when the crank angle number assumes "6." Therefore, if processing proceeds from step S1 to step S2 when the crank angle number is "3" or "4," the instantaneous rotational speed of the crankshaft computed from the crank pulse obtained at that time is not half or less the predicted rotational speed of the crankshaft, and processing returns to the main program without modification. When the crank angle number has assumed "6," processing shifts from step S3 to step S7. Here, the instantaneous rotational speed of the crankshaft computed from the current crank pulse is double or more the rotational speed of the crankshaft, and hence processing proceeds to step S9. However, at this point in time, the crank angle storage counter CNT stored in the storage device at this moment still remains "0." Hence, the noise flag $F_N$ is temporarily set to "1" in step S15 by way of steps S9, S12, and S14, and processing returns to the main program.

As mentioned previously, when noise has arisen once, the instantaneous rotational speed of the crankshaft rapidly decreases at the time of detection of the next crank pulse at which the instantaneous rotational speed of the crankshaft has increased rapidly. The crank angle number assumes "7" at the time of detection of the next crank pulse at which the noise flag $F_N$ is set. Processing proceeds from step S1 to step S8 byway of step S3. At this time, the noise flag $F_N$ still remains set, and hence processing proceeds to step S17. The crank angle number is "7," and hence processing proceeds to step S18. At this time, the instantaneous rotational speed of the crankshaft has rapidly increased. The instantaneous rotational speed of the crankshaft computed from the current crank pulse is one-fourth or less the instantaneous rotational speed of the crankshaft computed from the previous crank pulse, and hence processing proceeds to step S20, where noise is determined to have arisen once. The crank angle number is set to "6," that is, a correct crank angle number, and processing proceeds to step S21, whereupon the noise flag $F_N$ is reset to "0."

Even when noise has arisen twice, no change arises in the instantaneous rotational value of the crankshaft rapidly increasing when the crank angle number assumes "6." For this reason, when the crank angle number assumes "6," processing proceeds from step S3 to step S7. Here, the instantaneous rotational speed of the crankshaft computed from the current crank pulse is double or more the rotational speed of the crankshaft, and hence processing proceeds to step S9. The noise flag $F_N$ is set to "1" in step S15 by way of steps S12 and S14. Processing temporarily returns to the main program. In contrast, when noise has arisen twice, the instantaneous rotational speed of the crankshaft rapidly decreases. This happens when the second crank pulse is detected after the instantaneous rotational speed of the crankshaft is rapidly increased. For this reason, even when the crank angle number has assumed "7" at the time of detection of the next crank pulse at which the noise flag $F_N$ is set, processing returns to the main program from step S18 without modification.

Next, when the crank pulse is detected and the crank angle number has assumed "8," processing proceeds from step S17 to step S22 byway of step S19. Here, the instantaneous rotational speed of the crankshaft computed from the current crank pulse is one-fourth or less the instantaneous rotational speed of the crankshaft computed from the second previous crank pulse; that is, a crank angle number of "6." Hence, processing proceeds to step S22, where noise is determined to have arisen twice. Further, the crank angle number is set to "6"; that is, a correct crank angle number, and processing proceeds to step S21, whereupon the noise flag $F_N$ is reset to "0."

Figure 11A:
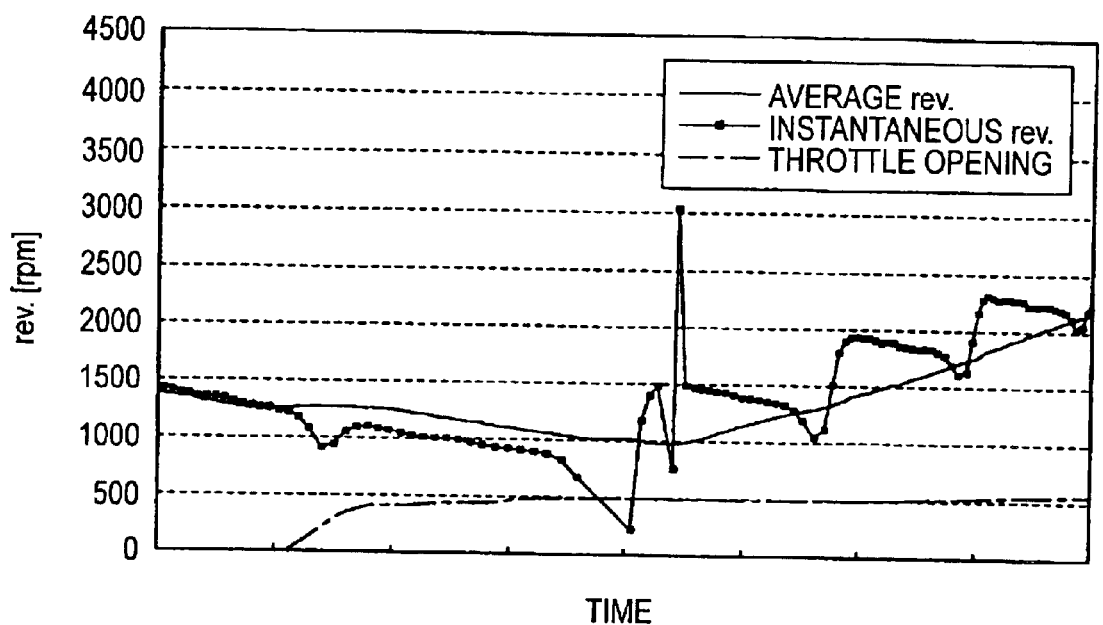
FIG. 11 is a descriptive view showing operation for correcting a crank angle through the computation processing shown in FIG. 10.
Figure 11B:
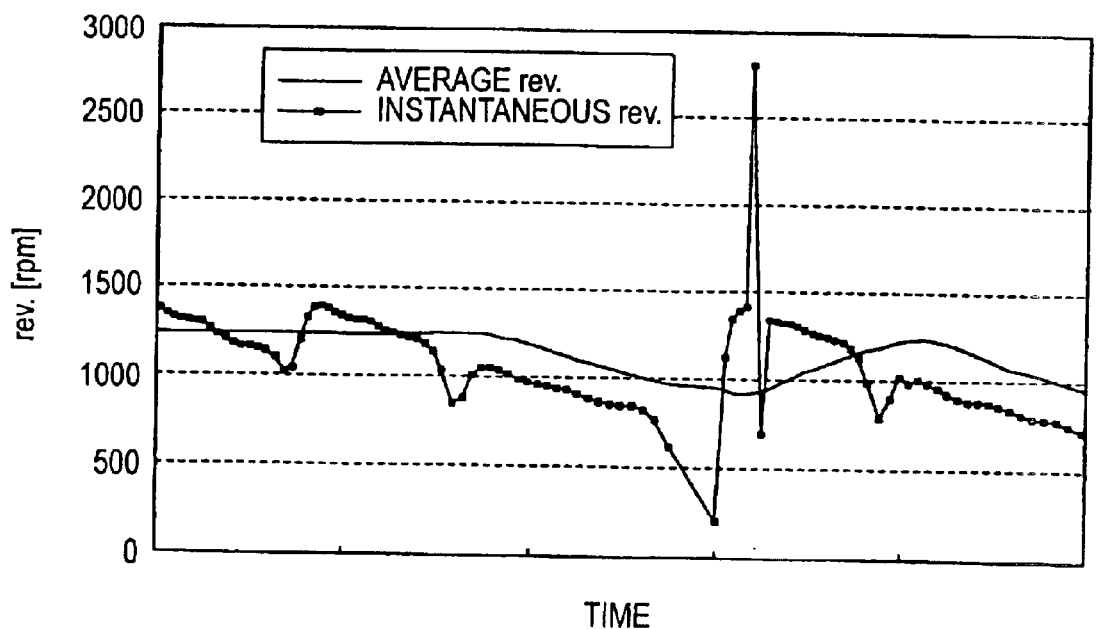

FIG. 11a shows a case where a crank pulse corresponding to one cog has dropped out, wherein the crank angle number is corrected through the computation processing shown in FIG. 10, and FIG. 11b shows a case where noise has arisen once, wherein the crank angle number is corrected through the computation processing shown in FIG. 10. As is evident from the drawings, the reason why the instantaneous rotational speed of the crankshaft has caused an error is that the crank pulse has dropped out or that the crank pulse has fallen within once cycle after occurrence of noise. Accurate detection of occurrence of erroneous-detection of a crank pulse and accurate correction of a crank angle are understood to be performed.

Figure 12:
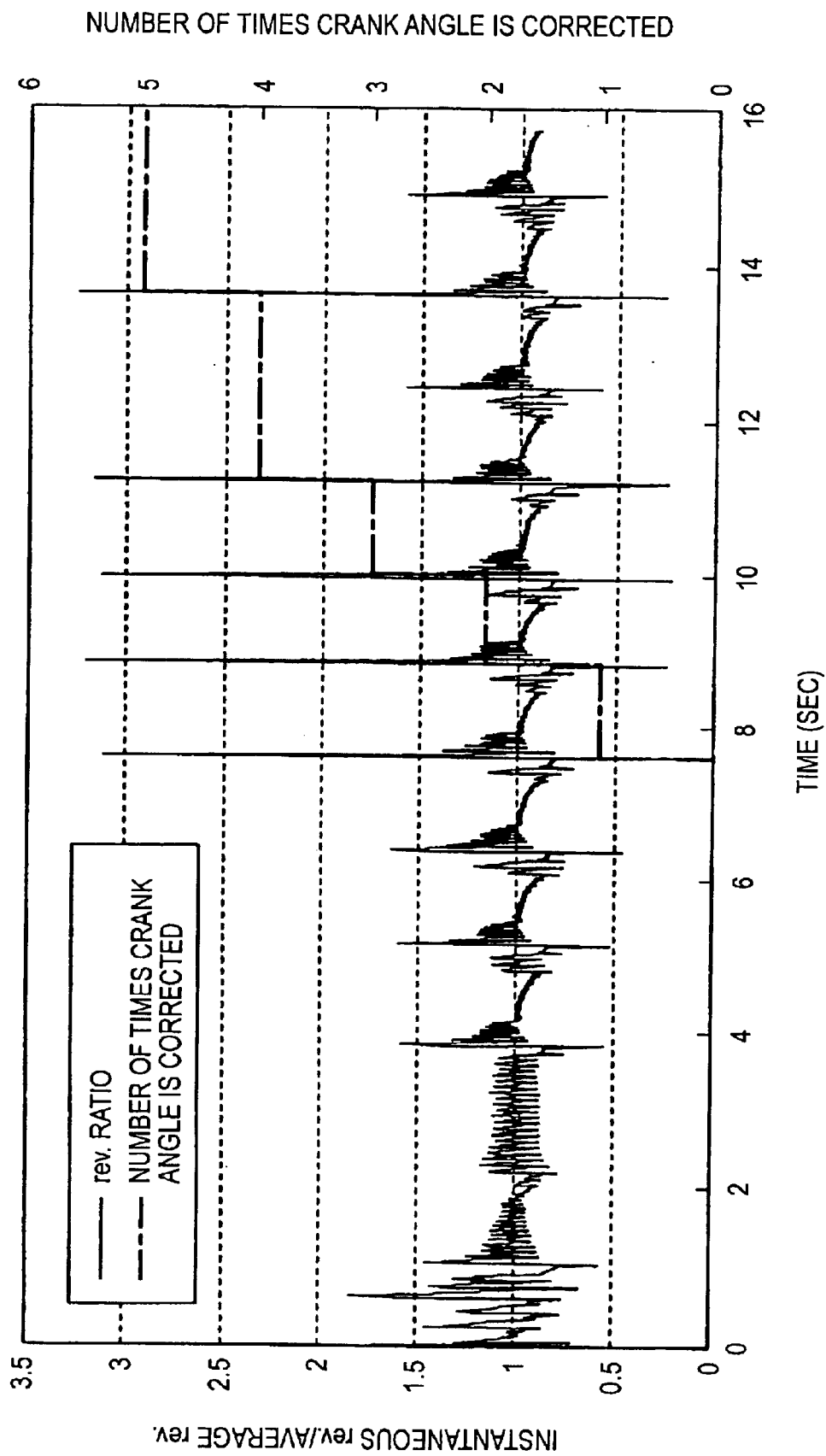
FIG. 12 is a descriptive view showing a relationship between an instantaneous rotational speed of the crankshaft obtained at the time of erroneous detection of the crank pulse and an average value of rotational speed of the crankshaft.

FIG. 12 shows that the ratio of the rotational speed of the crankshaft to the average value of rotational speed when the instantaneous rotational speed of the crankshaft has increased rapidly is determined through repeated, rapid, and intentional opening of the throttle valve. Simultaneously, the crank angle number is amended through the computing operation shown in FIG. 10, whereby the counter is incremented every time the crank angle number is amended. As is evident from the foregoing, accurate detection of a rapid increase in the instantaneous rotational speed of the crankshaft results in enhancement of the accuracy of detection of occurrence of erroneous-detection of a crank pulse. As is evident from the drawing, when the instantaneous rotational speed of the crankshaft rapidly increases as a result of occurrence of dropouts of the crank pulse, the instantaneous rotational speed greatly exceeds double the average value of rotational speed of the crankshaft, which shows that determination of occurrence of a dropout of crank pulse rendered in step 2 pertaining to the computing operation shown in FIG. 10 is reasonable.

The embodiment has described the engine of manifold injection type in detail. However, the engine controller of the invention can also be applied in the same manner to an engine of direct injection type.

Although the embodiment has also described the single cylinder engine in detail, the engine controller of the invention can also be applied in the same manner to a so-called multicylinder engine having two or more cylinders.

In the engine control unit, various processing circuits can also be used as substitutes for the microcomputer.

INDUSTRIAL APPLICABILITY

As is described in detail, according to an engine controller of claim 1 of the invention, cogs are provided at non-uniform intervals on an outer periphery of a crankshaft or a member which rotates in synchronism with the crankshaft. A pulse signal which is transmitted in association with an approach to the cogs is detected as a crank pulse. On the occasion of controlling the operating state of an engine on the basis of the phase of a crankshaft detected from the crank pulse, the rotational speed of the crankshaft determined from crank pulses assigned to specific cogs from among the cogs provided at non-uniform intervals is compared with the rotational speed of the, crankshaft determined from crank pulses assigned to cogs located in the vicinity of the specific cogs, thereby detecting occurrence of erroneous detection of a crank pulse. On the basis of the relationship between the pitch between the specific cogs and the pitch between the cogs located in the vicinity of the specific cogs, the computed rotational speeds of the crankshaft are compared with each other, thereby enabling accurate detection of occurrence of erroneous detection of a crank pulse.

By means of an engine controller of claim 2 of the invention, on the assumption that the pitch between the specific cogs among the cogs provided at non-uniform intervals is $\alpha$ times the pitch between the other cogs, when the instantaneous rotational speed of the crankshaft obtained from a crank pulse assigned to a cog before the specific cog is one-$\alpha^{th}$ or less a predicated rotational speed of the crankshaft obtained from a crank pulse assigned to the previous cog and when the instantaneous rotational speed of the crankshaft obtained from the crank pulse assigned to the specific cog is $\alpha$ times or more the average value of rotational speed of the crankshaft, a determination is made that crack pulses are detected erroneously; i.e., too few crank pulses are detected. Hence, detection of too few crank pulse can be detected accurately.

By means of an engine controller of claim 3 of the invention, on the assumption that a pitch between specific cogs from among cogs provided at non-uniform intervals is a times a pitch between the other cogs, when the instantaneous rotational speed of the crankshaft determined from the crank pulse assigned to the specific cogs is $\alpha$ times an average value of rotational speed of the crankshaft and when the instantaneous rotational speed of the crankshaft determined from crank pulses assigned to the cog next to the specific cog and those assigned to subsequent cogs is one-2$\alpha$th or less the instantaneous rotational speed of the crankshaft obtained before that, a determination is made that crank pulses are detected erroneously; i.e., too many crank pulses are detected. Hence, detection of too many crank pulses can be detected accurately.

What is claimed is:

1. An engine controller comprising:

cogs provided at non-uniform intervals on an outer periphery of a crankshaft or a member which rotates in synchronism with the crankshaft;

crank pulse generation means which transmits a pulse signal in association with an approach to said cogs;

crankshaft phase detection means for detecting the phase of a crankshaft from said crank pulse;

engine control means for controlling the operating state of an engine on the basis of the phase of said crankshaft detected by said crankshaft phase detection means; and erroneous-detection-of-crank-pulse detection means which detects occurrence of erroneous detection of said crank pulse by means of comparing the rotational speed of said crankshaft determined from crank pulses assigned to specific cogs from among said cogs provided at non-uniform intervals with the rotational speed of said crankshaft determined from crank pulses assigned to cogs located in the vicinity of said specific cogs.

2. The engine controller according to claim 1, wherein on the assumption that a pitch between said specific cogs among said cogs provided at non-uniform intervals is $\alpha$ times a pitch between the other cogs, when the instantaneous rotational speed of said crankshaft obtained from a crank pulse assigned to a cog before the specific cog is one $\alpha^{th}$ or less a predicated rotational speed of said crankshaft obtained from a crank pulse assigned to the previous cog and when the instantaneous rotational speed of said crankshaft obtained from the crank pulse assigned to said specific cog is a times $\alpha$ times or more the average value of rotational speed of said crankshaft, a determination is made that that crank pulse detection is erroneous, in that too few crank pulses are detected.

3. The engine controller according to claim 1 or 2, wherein on the assumption that a pitch between said specific cogs from among said cogs provided at non-uniform intervals is $\alpha$ times a pitch between the other cogs, when the instantaneous rotational speed of said crankshaft determined from the crank pulse assigned to said specific cogs is a times an average value of rotational speed of said crank shaft and when the instantaneous rotational speed of said crank shaft determined from crank pulses assigned to a cog next to said specific cog and those assigned to subsequent cogs is one-2$\alpha$th or less the instantaneous rotational speed of said crankshaft obtained before that, a determination is made that crank pulse detection is erroneous, in that too many crank pulses have detected.

* * * * *